Jan. 11, 1949.  A. S. PARKS  2,458,631
DRILL STEM TESTER
Filed March 30, 1944  2 Sheets-Sheet 1

INVENTOR.
ASBURY S. PARKS.
BY J. Vincent Martin
and
Ralph R. Browning
ATTORNEYS

Jan. 11, 1949. A. S. PARKS 2,458,631
DRILL STEM TESTER
Filed March 30, 1944 2 Sheets-Sheet 2

INVENTOR.
ASBURY S. PARKS
BY J. Vincent Martin
and
Ralph C. Browning
ATTORNEYS

Patented Jan. 11, 1949

2,458,631

UNITED STATES PATENT OFFICE 2,458,631

DRILL STEM TESTER

Asbury S. Parks, Houston, Tex.

Application March 30, 1944, Serial No. 528,757

11 Claims. (Cl. 166—1)

This invention relates to a device for testing earth formations through which a well has been drilled and has for its general object the provision of a device which is capable of testing the production from such formations at any point along the open bore hole.

One of the principal objects of this invention to produce a testing apparatus capable of testing the production from formations within a bore hole regardless of the location of such formations with respect to the bottom of the hole and without the necessity for setting casing in the hole before conducting the test.

It is a more specific object of this invention to provide a device capable of testing the formation through which a bore hole has been drilled, regardless of the position of such formation with respect to the bottom of the hole, to provide in such a construction a means which will make it possible to positively position the tester at any desired point in the depth of the well, to provide a packing means which may be expanded radially without longitudinal movement of any of the parts thereof and which may be released in the same manner thereby avoiding the dangers of becoming stuck in the hole, to provide such a packer which may be made substantially smaller in diameter than the diameter of the hole in which it is to be used, to provide such a packer if desired with corrugations or ridges on its outer surface so as to gain the advantage of a packer having successive spaced zones of heavy pressure against the formation, to provide packing means which is well adapted for use in holes in which the diameter varies considerably from one point to another and in which the inner wall of the hole may be very irregular or non-circular, and to provide a structure with an intake valve arrangement which cannot be opened until after the packers have been expanded sufficiently to seal against the wall of the hole and thus seal off the formation which is to be tested.

It is further an object of this invention to provide a device which will make possible a drilling practice in which a hole may be drilled of uniform diameter to the depth desired and then the various formations through which the hole may have passed tested for production without the necessity of having to stop drilling at frequent intervals to drill a rat hole at the bottom of the bore hole for testing purposes and without the necessity for having to set casing in the hole and then perforate the casing opposite the formations to be tested before they can be tested.

Other objects and advantages of this invention will become apparent from the following description taken in connection with the accompanying drawing wherein is set forth by way of illustration and example one embodiment of the invention.

Figure 1:
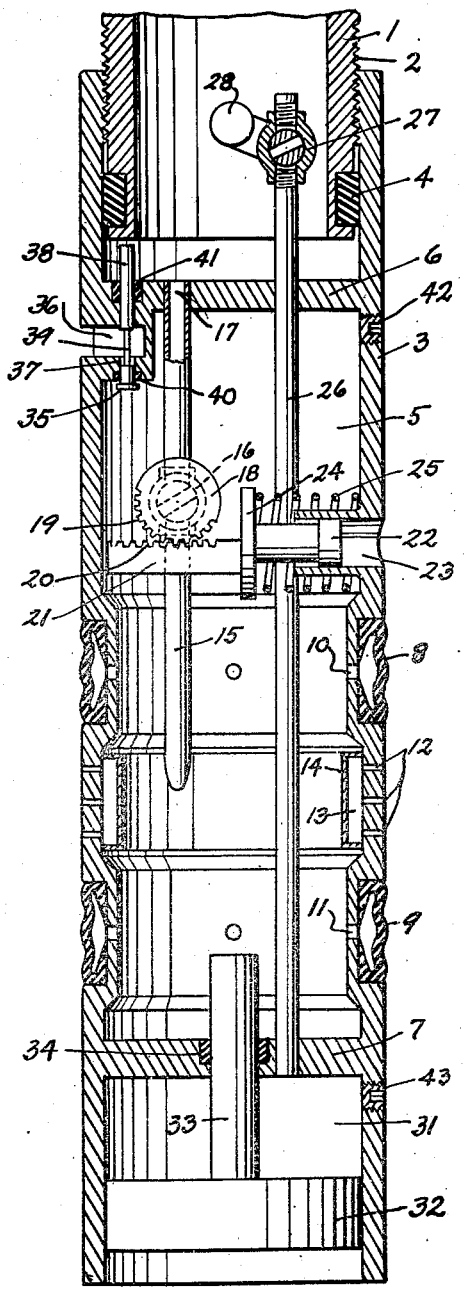
Fig. 1 shows a longitudinal cross section through a well tester constructed in accordance with this invention.

Referring more particularly to the drawing there is secured to the lower end of the drill stem or other pipe upon which the tester is to be operated a fiting 1 having straight threads 2 adapted to receive the upper end of the tester body 3. This fitting 1 also carries a suitable packing 4 adapted to form a seal below the threads 2 so as to permit the fitting 1 to be rotated with respect to the body 3 without leakage between these parts.

The body 3 has within it a pressure chamber 5 the opposite ends of which are closed by partitions 6 and 7 spaced from the upper and lower ends of the body respectively and extending transversely of the body.

Extending about the body intermediate the partitions 6 and 7 are a pair of spaced expansible packers 8 and 9 adapted to be expanded by means of fluid pressure from within the body, this fluid pressure having access to the interior of the packings 8 and 9 through openings 10 and 11 respectively. Preferably these packings are of such material that they are capable of being stretched to the extent necessary to expand them against the inner wall of the well hole even though that hole may be substantially larger than the unexpanded diameter of the packing.

Between the two packers 8 and 9 the body is provided with openings 12 extending from the outer surface of the body and opening at their inner ends into an annular space 13 defined by the annular enclosure 14.

Secured to and communicating with the interior of the annular enclosure 14 is a conduit 15 which leads upwardly to a cutoff valve 16 adapted to control the flow of fluid from the formation into the testing device. The conduit 15 continues upwardly from the valve 16 and empties at 17 through the partition 6 into the lower end of the fitting 1 and thence into the drill stem or other pipe on which the tester is being operated.

Valve 16 has a rotary plug which is rotated by means of a disc-like member 18 fixed thereto and having pinion teeth 19 extending over at least a part of its circumference. These pinion teeth 19 are adapted to mesh with the rack teeth 20 on the rack bar 21. Rack bar 21 is in turn integrally connected with the piston 22 that is slidably mounted in a cylindrical opening 23 in the wall of the body 3. The outer end of this cylindrical opening is open to the exterior of the body and the inner end to the interior of the body. At the point of juncture between the piston 22 and the rack bar 21 a disc-like part 24 is provided, and between this part 24 and the inner wall of the body 3 there is positioned a compression spring 25 which at all times tends to urge the piston 22 toward the interior of the body and the rack bar 21 in such a direction as to close the valve 16.

Extending through both of the partitions 6 and 7 and throughout the entire length of the chamber 5 within the body 3 is a conduit 26 having a shutoff valve 27 at its upper end, which valve is adapted to be moved to open position when the lever 28 on this valve is contacted by means of a weight 29 or the like dropped through the drill stem or other pipe. Preferably also there is located within the upper end of the conduit 26 above the valve 27 a back pressure or check valve 30 so positioned as to permit flow upwardly through the conduit 26 but prevent down flow through this conduit from the interior of the fitting 1.

At its lower end the conduit 26 opens into a chamber 31 above a piston 32 which is slidably carried in the lower portion of the body 3. Integral with this piston 32 is a plunger 33 that extends upwardly through the partition 7 and has its inner end exposed to the interior of the chamber 5. Suitable packing 34 is provided about the plunger 33 to prevent leakage between the chamber 5 and the chamber 31, and it will be understood that if found necessary or desirable, any suitable means may be provided for forming a seal between the piston 32 and the inner walls of the body about the chamber 31. Chamber 31 is filled with liquid and with valve 27 closed and plug 43 in place piston 32 will be held in the cylinder by the positive pressure on its lower face and the zero pressure on its upper face.

Adjacent the upper end of the chamber 5 and above the upper packer 8 there is arranged a valve 35 adapted to control a passage 37 from the interior of the chamber 5 into a recess 36 in the sidewall of the body and open to the exterior thereof. This passage 37 between the chamber 5 and the recess 36 may be opened by downward movement of the valve 35 so as to permit pressure fluid from within the chamber 5 to pass outwardly to the exterior of the body. The valve has on its upper end a stem 38 which is connected to the valve by a small intermediate portion 39, this stem 38 projecting above the partition 6 and being located so that when the fitting 1 is threaded further into the upper end of the body it will engage the stem 38 moving it downwardly and cause the opening of the valve.

Suitable packing material 40 may be arranged to provide a proper valve seat for the valve 35, and other suitable packing 41 may be arranged around the stem 38 for the purpose of preventing leakage around this stem.

For the purpose of filling the chamber 5 with liquid as hereinafter described, there may be provided a plug 42, and a similar plug 43 may be provided for the purpose of filling the chamber 31 with liquid.

In operation, the device will be lowered into a bore hole with the parts in the position shown in Fig. 1. The chamber 5 and the chamber 31 will both have been filled with a suitable liquid and the valves 16 and 27 will be in closed position is illustrated.

When the device has reached the position where it is desired to take a sample from the formation surrounding the bore hole, a suitable weight 29 will be dropped in through the drill stem or pipe on which the device is being operated and this weight upon coming in contact with the lever 28 will move the valve 27 to its open position. It will be understood of course that this weight 29 may be lowered on a wire line or cable if so desired, or that other means may be provided for moving the valve 27 from closed to open position.

Now it will be appreciated that as the device is lowered into a hole filled with mud or other liquid as is the usual practice, the pressure against the lower side of the piston 32 will have continually increased in direct proportion to the distance of the device below the upper end of the bore hole. Meantime, the interior of the drill stem or other pipe will have been left free of liquid or substantially so and when the valve 27 is opened in the manner just described, flow of fluid from above the piston 32 upwardly into the drill stem will be permitted. When this flow takes place, the piston 32 will be moved upwardly by the pressure of the mud or other fluid in the well against its lower surface, and this will cause the plunger 33 to move further into the chamber 5. Inasmuch as the chamber 5 was initially filled with liquid which is substantially incompressible, the upward movement of the plunger 33 will cause this liquid to flow through the openings 10 and 11 and expand the packers 8 and 9 until they are in contact with the walls of the bore hole and form a seal thereagainst. The strength of the spring 25 will have been so chosen with respect to the strength of the material of the packings 8 and 9 that the packings will first expand and that as the pressure is thereafter increased the piston 22 will be forced outwardly against the tension of the spring 25.

Figure 2:
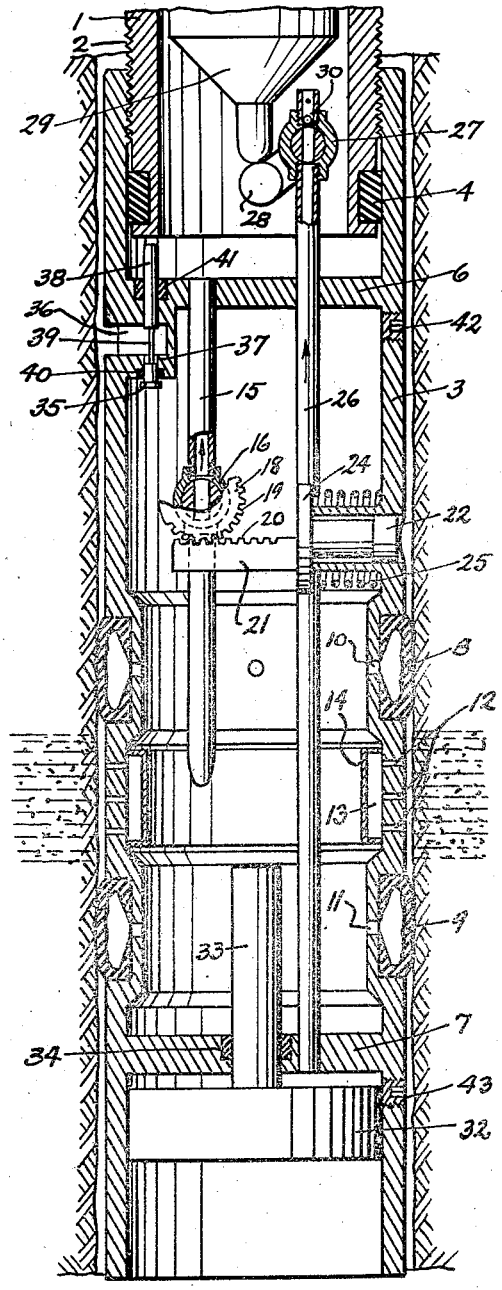
Fig. 2 is a similar view of the same device in position within a bore hole after the packers have been expanded to seal off the formation to be tested and the valve opened to admit into the tester production from such formation.
Figure 4:
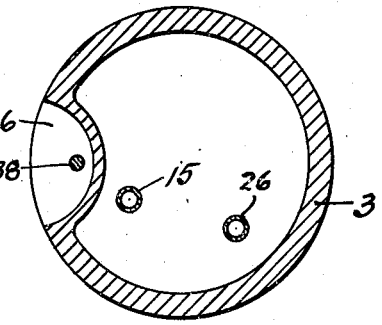
Fig. 4 is a transverse cross section taken along the line 4—4 of Fig. 3.
Figure 3:
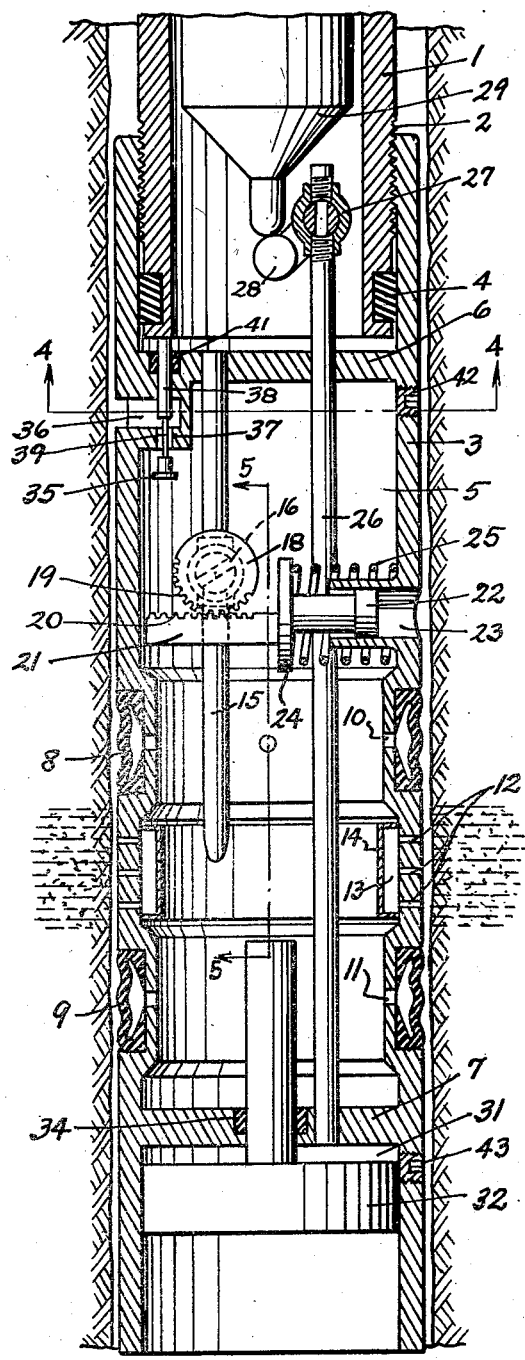
Fig. 3 is a view similar to Figs. 1 and 2 but showing the same apparatus after the intake valve has been closed and the packers released so that the device may be removed from the bore hole.
Figure 5:
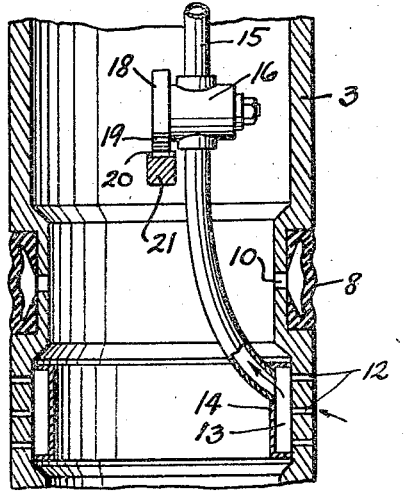
Fig. 5 is a fragmentary longitudinal cross section taken along the line 5—5 of Fig. 3 and showing the manner of connection of the intake openings of the device to the valve controlling the inflow from the formation being tested.

The expansion of the packers 8 and 9 into contact with the formation will seal off that portion of the formation between these packers and opposite the openings 12. Then when it further increases the pressure within the chamber 5 causes the piston 22 to move to the right as seen in Fig. 1, the result will be an opening of the valve 16 and a consequent connection from the exterior of the body between the packers to the annular space 13, thence through the conduit 15 and the valve 16 to the interior of the drill stem. The condition of the parts at this point is illustrated in Fig. 2 and it will be seen that flow may take place from the formation being tested through the openings 12 and the other parts just referred to into the drill stem, thus providing a sample of the production from this formation.

When a sufficient test of the formation indicated has been obtained, the drill stem may be rotated to screw the fitting 1 downwardly into the body 3. The body 3 will be held against rotation at this point because of the contact between the packers 8 and 9 and the sidewalls of the hole, and as the fitting 1 is screwed further into the body its lower end will come in contact with the stem 38 on the valve 35 and move this stem and valve downwardly until the valve is open and permits flow from the chamber 5 to the exterior of the body 3.

With the vale 35 thus open, the pressure within the body 5 will be released and the piston 22 will be returned to its original position closing the valve 16 by virtue of the tension on the spring 25. As the pressure within the chamber 5 is further reduced, the packers 8 and 9 will be permitted to contract by virtue of their own inherent elasticity until they occupy their original positions. This contraction, as illustrated, may be in a truly radial direction and it is unnecessary for the packer material to slide over the formation in either direction during either the expansion or the contraction thereof. The intake valve 16 having thus been closed and the packers retracted and released from the formation, the device may be removed from the bore hole without difficulty.

It will be appreciated from the foregoing description that a device has been provided which is capable of accomplishing all of the objects set forth in connection with this invention, and it is especially to be noted that after one test of a given formation has been completed, the device may be moved either upwardly or downwardly to assist in relieving the device from debris which might tend to prevent it from being moved directly upwardly.

Having described my invention, I claim:

1. A formation tester for testing a desired formation in a bore hole, comprising a body adapted to be lowered into the bore hole, annular packer means carried by said body and expansible by fluid pressure into contact with the formation within the bore hole to seal off from the remainder of the bore hole the formation to be tested, a compressor carried by said body for supplying fluid under pressure to the packer means to expand same, means for initially holding said compressor from operation, means for releasing said holding means, means actuated by the pressure fluid in said bore hole for operating said compressor upon release of said holding means, a fluid receptacle, means for conducting fluid from the formation sealed off by said packer means to the interior of said receptacle, and means for releasing said fluid pressure within the body to permit contraction of said packer means.

2. A formation tester for testing a desired formation in a bore hole comprising a body adapted to be lowered into the bore hole, annular packer means carried by said body and expansible by fluid pressure into contact with the formation within the bore hole to seal off from the remainder of the bore hole the formation to be tested, a fluid receptacle, means for conducting fluid from the formation sealed off by said packer means to the interior of said receptacle, a valve controlling flow through said conducting means, fluid pressure operated means for opening and closing said valve, means for supplying fluid under pressure to said packer means and valve operating means to first expand said packer means and thereafter open said valve, means for initially holding said fluid supplying means from operation until the desired formation is reached, means for releasing said holding means, and means for releasing the pressure on said packer means and valve operating means to cause said valve to close and to permit contraction of said packer means.

3. A formation tester for testing a desired formation in a bore hole, comprising a body adapted to be lowered into the bore hole, annular packer means carried by said body and expansible by fluid pressure from within said body into contact with the formation within the bore hole to seal off from the remainder of the bore hole the formation to be tested, a fluid receptacle connected with said body, means for conducting fluid from the formation sealed off by said packer means to the interior of said receptacle, a valve for controlling flow through said conducting means, means actuated by a differential of fluid pressure between the interior and exterior of said body for opening said valve when the pressure within said body exceeds that outside of said body by a predetermined amount, and said amount being greater than that carried to expand said packer means, means for supplying fluid under pressure to the interior of said body to expand said packer means and thereafter open said valve, means for initially holding said fluid supplying means from operation until the desired formation is reached, means for releasing said holding means, and means for releasing the pressure within said body to permit the closure of said valve and contraction of said packer means.

4. A formation tester for testing a desired formation in a bore hole, comprising a body adapted to be lowered into the bore hole, annular packer means carried by said body and expansible by fluid pressure from within said body into contact with the formation within the bore hole to seal off from the remainder of the bore hole the formation to be tested, a fluid receptacle connected with said body, means for conducting fluid from the formation sealed off by said packer means to the interior of said receptacle, a valve for controlling flow through said conducting means, means actuated by a differential of fluid pressure between the interior and exterior of said body for opening said valve when the pressure within said body exceeds that outside of said body by a predetermined amount, and said amount being greater than that carried to expand said packer means, means for supplying fluid under pressure to the interior of said body comprising a differential piston having its larger area exposed to the exterior of said body and its smaller area to the interior of said body, means for initially holding said differential piston against movement, and means for releasing said holding means.

5. A formation tester for testing a desired formation in a bore hole, comprising a body adapted to be lowered into the bore hole, a pipe threadedly engaging said body with a readily rotatable connection, means for sealing the rotatable connection between said pipe and said body, annular packer means carried by said body and expansible by fluid pressure into contact with the formation within the bore hole to seal off from the remainder of the bore hole the formation to be tested, means for supplying fluid under pressure to expand said packer means, means for conducting fluid from the formation sealed off by said packer means to the interior of said pipe, and a valve carried by said body and positioned for engagement by the lower end of said pipe upon rotation of said pipe with respect to said body to open said valve and release said fluid pressure from within said packer means and permit contraction of said packer means.

6. A device for determining the characteristics of a formation at a selected level within a bore hole comprising a body having a variable capacity compartment therein, a pair of spaced expansible packers surrounding the body and communicating with the compartment, said packers adapted when expanded to seal off a portion of the formation to be tested, means for initially holding the pressure in said compartment constant with the packers in deflated condition until the selected level is reached, means for releasing said holding means, means responsive to the pressure of the fluid in the bore hole to selectively vary the capacity of said compartment to vary the pressure therein providing for selective expansion of the packers upon release of said holding means, a fluid receptacle within the body, and a connection communicating with the receptacle and the exterior of the body at a position intermediate the packers.

7. A device for determining the characteristics of a formation at a selected level within a bore hole comprising a body having a variable capacity compartment therein, a pair of spaced expansible packers surrounding the body and communicating with the compartment, said packers adapted when expanded to seal off a portion of the formation to be tested, means for initially holding the pressure in said compartment constant with the packers in deflated condition until the selected level is reached, means for releasing said holding means, means responsive to the pressure of the fluid in the bore hole to selectively vary the capacity of said compartment to vary the pressure therein providing for selective expansion of the packers upon release of said holding means, a fluid receptacle within the body, a connection communicating with the receptacle and the exterior of the body at a position intermediate the packers, and a pressure responsive valve in said connection, said valve adapted to be open when the pressure within the said compartment exceeds a predetermined amount and to be closed when the compartment pressure falls below a predetermined amount.

8. A device for determining the characteristics of a formation at a selected level within a bore hole comprising a body with a variable capacity compartment therein, expansible spaced apart packers surrounding the body and communicating with the compartment, means for withdrawing fluid from the exterior of said body at a level intermediate the packers when the packers are expanded, said means being openable and closeable responsive to the fluid pressure within the compartment, means for initially holding the pressure in said compartment constant with the packers in deflated condition until the selected level is reached, means for releasing said holding means, and means to vary the pressure within the compartment to control the packers and fluid withdrawing means upon release of said holding means.

9. A device for determining the characteristics of a formation at a selected level within a bore hole comprising a body with a variable capacity compartment therein, expansible spaced apart packers surrounding the body and communicating with the compartment, means for withdrawing fluid from the exterior of said body at a level intermediate the packers when the packers are expanded, said means being openable and closeable responsive to the fluid pressure within the compartment, means for initially holding the pressure in said compartment constant with the packers in deflated condition until the selected level is reached, means for releasing said holding means, means to vary the pressure within the compartment to control the packers and fluid withdrawing means upon the release of said holding means, and means controllable from the surface to relieve pressure within the compartment to facilitate withdrawal of the device from the bore hole.

10. A device for determining the characteristics of a formation at a selected level within a bore hole comprising a body with a variable capacity compartment therein, expansible spaced apart packers surrounding the body and communicating with the compartment, means for withdrawing fluid from the exterior of said body at a level intermediate the packers when the packers are expanded, said means being openable and closeable responsive to the fluid pressure within the compartment, means for initially holding the pressure in said compartment constant with the packers in deflated condition until the selected level is reached, means for releasing said holding means, means to vary the pressure within the compartment to control the packers and fluid withdrawing means upon the release of said holding means, said compartment pressure varying means including a chamber carried by the body, a piston therein having its working face exposed to the fluid within the well bore and its other face forming one chamber wall, and a plunger extending from the piston into the compartment whereby movement of the piston in response to pressure of well bore fluid varies the capacity of the compartment.

11. A device for determining the characteristics of a formation at a selected level within a bore hole comprising a body with a variable capacity compartment therein, expansible spaced apart packers surrounding the body and communicating with the compartment, means for withdrawing fluid from the exterior of said body at a level intermediate the packers when the packers are expanded, said means openable and closeable responsive to the fluid pressure within the compartment, means for initially holding the pressure in said compartment constant with the packers in deflated condition until the selected level is reached, means for releasing said holding means, means to vary the pressure within the compartment to control the packers and fluid withdrawing means upon release of said holding means, said compartment pressure varying means including a chamber carried by the body, a piston therein having its working face exposed to the fluid within the well bore and its other face forming one chamber wall, a plunger extending from the piston into the compartment whereby movement of the piston in response to pressure of well bore fluid varies the capacity of the compartment, and means to selectively relieve the pressure within the compartment to facilitate withdrawal of the device from the bore hole.

ASBURY S. PARKS.

REFERENCES CITED

The following references are of record in the file of this patent:

UNITED STATES PATENTS

| Number | Name | Date |
| --- | --- | --- |
| 2,207,001 | Dillon | July 9, 1940 |
| 2,218,155 | Rusler et al. | Oct. 15, 1940 |
| 2,227,731 | Lynes | Jan. 7, 1941 |
| 2,347,729 | Benz | May 2, 1944 |